Feb. 28, 1939.  E. E. HEWITT  2,148,751
BRAKE SYSTEM
Filed Oct. 10, 1934  2 Sheets—Sheet 1

INVENTOR
ELLIS E. HEWITT.
ATTORNEY

Feb. 28, 1939.  E. E. HEWITT  2,148,751
BRAKE SYSTEM
Filed Oct. 10, 1934  2 Sheets-Sheet 2

INVENTOR
ELLIS E. HEWITT.
BY Wm. M. Cady
ATTORNEY

Patented Feb. 28, 1939

2,148,751

UNITED STATES PATENT OFFICE 2,148,751

BRAKE SYSTEM

Ellis E. Hewitt, Edgewood, Pa., assignor to The Westinghouse Air Brake Company, Wilmerding, Pa., a corporation of Pennsylvania Application October 10, 1934, Serial No. 747,730

18 Claims. (Cl. 303—24)

My invention relates to electropneumatic brake equipment for vehicles and more particularly to such equipment for multiple unit railway trains in which an electrically operated self-lapping valve means is provided on each braking unit for controlling the application and release of the brakes.

In the operation of high speed trains and similar vehicles, it is desirable to provide a brake equipment having ample braking capacity to take care of the most rigid requirements the equipment will be called upon to meet. It is well known that for a given braking pressure friction type brakes are less effective in retarding the motion of a vehicle at high speeds than at low speeds because the coefficient of friction between the rubbing parts is lower at high speeds than at low speeds. In order to bring a vehicle to a stop quickly it has been the usual practice for an operator to apply the brakes with a high degree of braking pressure at the high speeds and, as the speed of the vehicle decreases, to so operate the brakes as to cause the braking pressure to be decreased in such manner that the vehicle is brought to a stop quickly and smoothly without dangerous shock or skidding of the wheels.

It is an object of my invention to provide a braking system in which the brake cylinder pressure during a brake application will be in direct proportion to the position of the brake control handle in its movement from release position to full application position.

It is another object of my invention to provide a light weight brake equipment that is low in cost and simple in construction for use on multiple unit trains in which a uniform fast application and release of the brakes may be obtained on all cars or train units.

It is a further object of my invention to provide an electropneumatic brake equipment in which a magnet valve device is provided on each car or truck unit for controlling the supply of fluid under pressure to the brake cylinder, and in which means is provided for varying the brake cylinder pressure in accordance with the degree of energization of the magnet valve device.

It is a further object of my invention to provide an electropneumatic brake equipment in which a pneumatic emergency brake application is available in the event of failure of the electrical equipment.

Other objects and advantages of my invention will be apparent from the following description of one preferred embodiment thereof when taken in connection with the accompanying drawings, in which—

Figure 1:
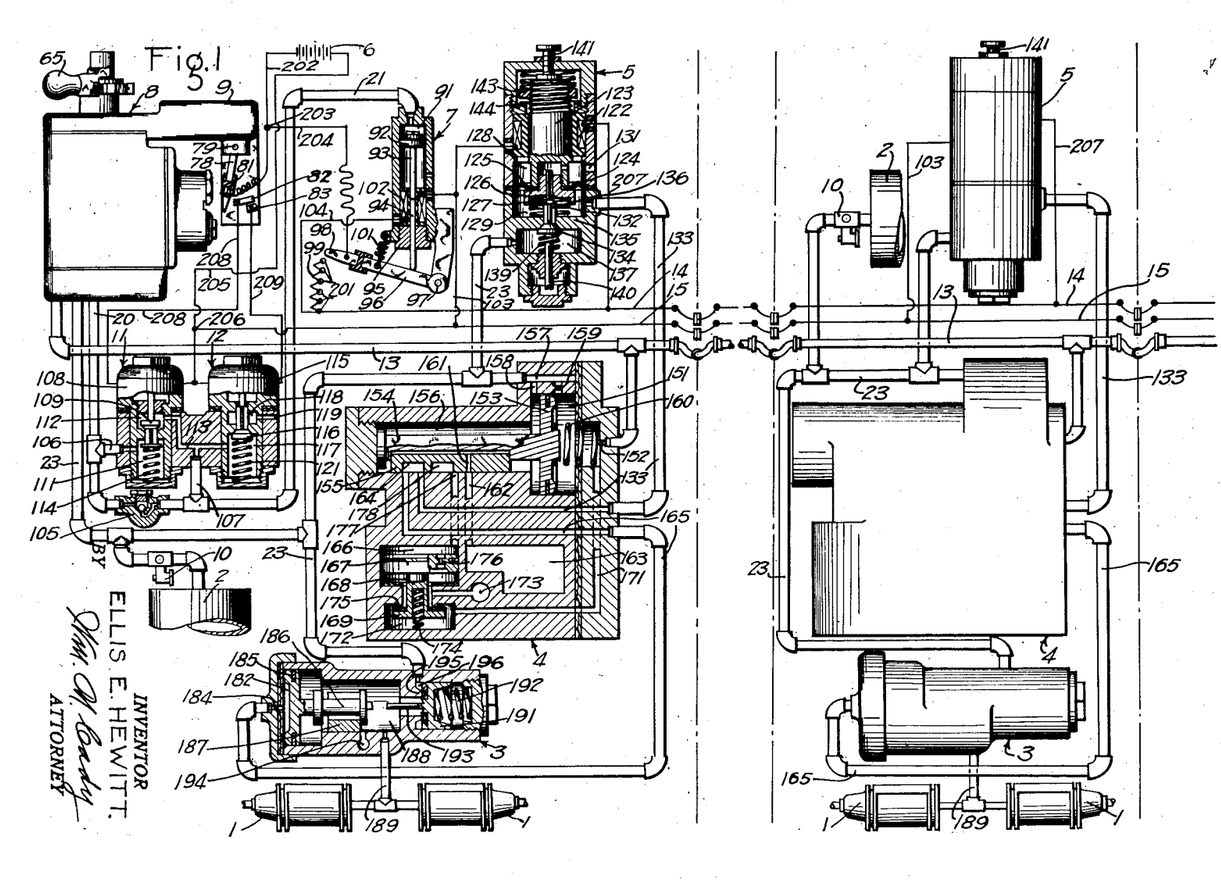
Fig. 1 is a diagrammatic view illustrating circuits and apparatus comprising one preferred embodiment of my invention.

Referring to the drawings and more particularly to Fig. 1 thereof, in which brake apparatus 15 is illustrated as employed in accordance with my invention on two train units, the apparatus comprises brake cylinders 1 through which the brakes are applied upon the flow of fluid under pressure thereto as supplied by a feed valve 10 from a main reservoir 2 on each unit as controlled by a relay valve device 3 that is governed either in accordance with the operation of an emergency valve device 4 upon a reduction in pressure in the emergency pipe 13, or by a self-lapping magnet valve device 5 that is energized from a constant voltage source of electric energy 6 in accordance with the operation of a pressure operated rheostat 7 that is governed by a self-lapping brake valve device 8. The brake valve device 8 includes a retardation controller section 9 that is adapted to control the operation of retardation controller magnet valve devices 11 and 12 to automatically control the degree of a service application of the brakes in accordance with the position of the handle of the brake valve device.

An emergency brake pipe 13 extends from the brake valve device 8 throughout the length of the train and is provided with branch pipes to the emergency valve devices 4 carried on each train unit. Train wires 14 and 15 extend from the pressure operated rheostat 7 throughout the length of the train for controlling the energization of the several self-lapping magnet valve devices 5, one of which is associated with each train unit. The apparatus associated with each train unit and controlled in accordance with the degree of energization of the wires 14 and 15, correspond to that shown in detail on the first train unit and are indicated by the same numerals on the second unit. As illustrated a separate main reservoir 2 is provided on each train unit and is separately charged from a compressor on the unit, not shown.

The brake valve device 8, best shown in Figs. 2, 3, 4 and 5 of the drawings, may correspond to that disclosed and claimed in United States patent application of Ewing K. Lynn and Rankin J. Bush, for Improvements in brake valve devices, Serial No. 569,158, filed October 16, 1931, and assigned to the same assignee as this application.

Figures 2, 3, 4, 5:
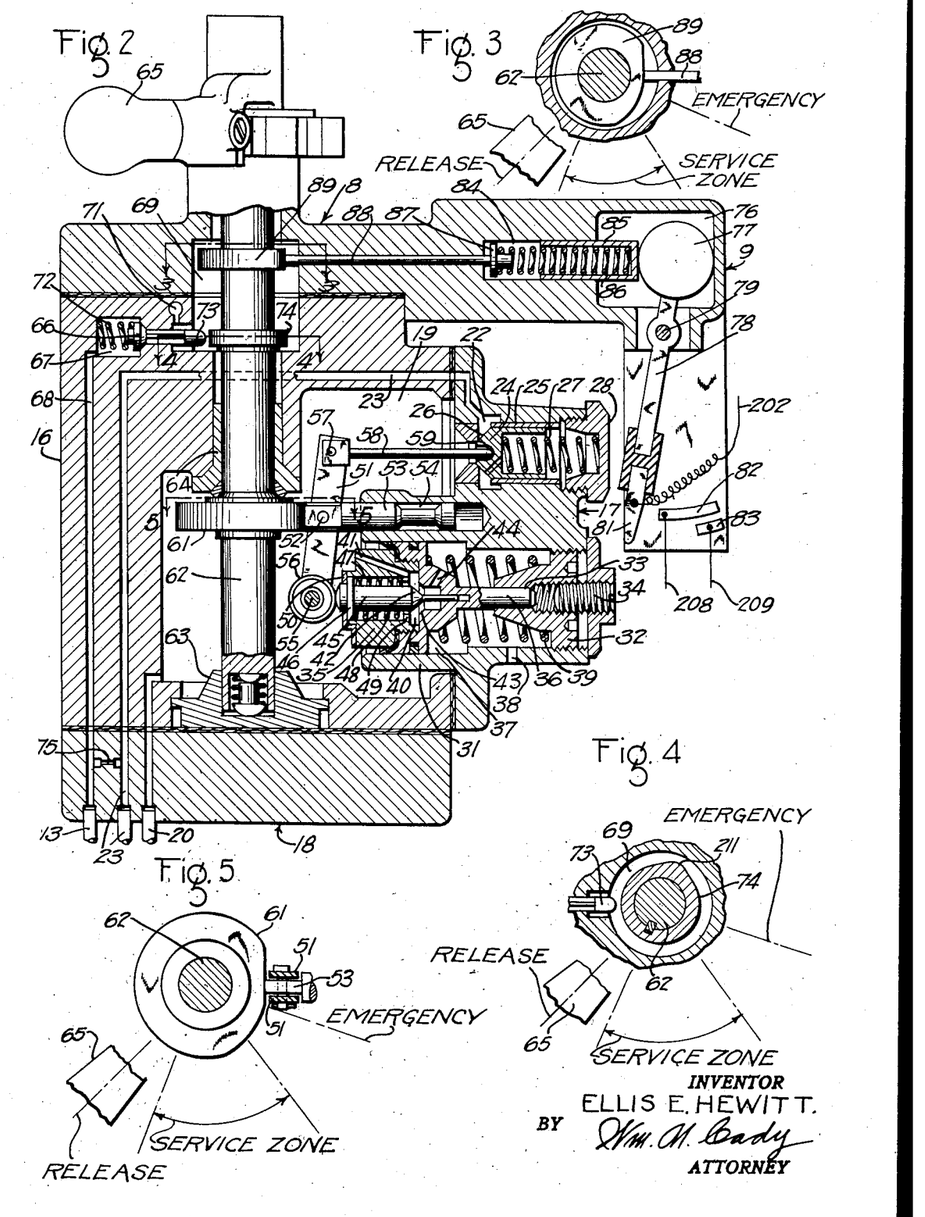
Fig. 2 is a diagrammatic sectional view of the self-lapping brake valve device shown in Fig. 1.
Fig. 3 is a sectional view taken on the line 3—3 of Fig. 2.
Fig. 4 is a sectional view taken on the line 4—4 of Fig. 2.
Fig. 5 is a sectional view taken on the line 5—5 of Fig. 2.

The brake valve device 8 comprises a main body portion 16, a valve portion 17, a bracket portion 18 and a top or retardation controller portion 9. The main body portion, the valve portion, and the bracket portion together define a pressure chamber 19 that is in open communication through passage and pipe 20, and pipe 21, with the pressure controlled rheostat 7. The magnet valve devices 11 and 12 are interposed between the pipes 20 and 21 to regulate the pressure of fluid acting on the rheostat 7 in accordance with the rate of retardation of the vehicle. The valve portion 17 is provided with a supply valve chamber 22 to which a feed valve device of the usual type supplies fluid under pressure at a reduced pressure from the main reservoir 2 carried on the first train unit, through pipe 23. A supply valve 24 is contained within the supply valve chamber 22 and is slidably disposed within the bushing sleeve 25 to engage a seat 26 carried by the valve portion of the casing. The valve 24 is subject to the pressure of a spring 27, one end of which engages the valve and the other end of which engages a nut 28 screw-threadedly attached within a bore in the valve portion casing.

The valve portion or section 17 of the casing is also provided with a cylinder 31 which is open at one end to the pressure chamber 19, the other end of the cylinder being closed by an adjusting member 32 screw-threadedly attached within a bore in the casing section. The adjusting member 32 is provided with a central bore 33 which at its outer end is tapped to receive a screw-threaded cap member 34.

Operatively mounted in the cylinder 31, adjacent to its open end, is a movable abutment in the form of a piston 35 having a stem 36 which is slidably guided by adjustable member 32 within the inner end of the bore 33. At one end of the piston 35 is a chamber 37 which is constantly open to the atmosphere through a passage 38. A coil spring 39 is contained in the chamber 37 and is interposed between and engages the inner face of the piston 35 and the inner face of the adjusting member 32.

A release valve chamber 40 is provided within the piston 35, and is in open communication with the pressure chamber 19 through a passage 41. A release valve 42 is contained within the chamber 40 and is adapted to seat on a valve seat 43 formed on the piston and which is operative to control communication between the valve chamber 40 and the chamber 37, through connecting passage 44 in the piston stem 36. The release valve is provided with a stem 45, the small end of which slides within the bore in the stem of the piston 35, and the larger end of which is provided with a collar 46 which slidably engages the piston within a central bore 47 and is subject to the pressure of the release valve spring 48 interposed between the engaging collar 46 and an annular flange 49 on the piston. Outward movement of the release valve relative to the piston 35 is limited by the collar 46 which engages a stop plate 50 that is secured to the piston 35. The outer end of the valve stem 45 extends through an opening in the stop plate 50 and beyond the face of the piston, and is adapted to be operatively engaged by a mechanism that will now be described.

A mechanism is provided for controlling the operation of the supply valve 24 and the release valve 42 comprising spaced levers 51 that are pivotally mounted intermediate their ends on a pin 52 supported in a plunger 53 that is slidably guided within a bore 54 in the casing section 17.

The lower ends of the spaced levers 51 are connected together by a pin 55 which is loosely mounted in a roller 56 that is adapted to operatively engage the outer ends of the release valve stem 45. The upper ends of the spaced levers 51 are connected together by a pin 57 on which one end of an operating rod 58 is pivotally mounted, the opposite end of the rod operatively engaging the supply valve 24 within a recess 59 formed in its face.

For the purpose of operating the plunger 53 a cam 61 is provided, having a peripheral face for engaging the end of the plunger 53 and mounted upon a shaft 62 that is supported by a step bearing 63 and a sleeve bearing 64, and that extends upwardly through the cover of the valve casing and is provided with an operating handle 65.

When the handle 65 and the cam 61 are in their release positions, as shown in Figs. 2 and 5, the spring 27 forces the supply valve 24 to its seated position and the spring 48 forces the release valve 42 toward the left or to its unseated position. It will be appreciated that the force of the release valve spring 48 is less than the force of the supply valve spring 27, which is less than the force of the regulating spring 39.

In order to provide for emergency operation of the brakes an emergency valve 66 is provided in an emergency valve chamber 67 located in the upper part of the main casing section 16 for controlling communication between the emergency pipe 13, with which the emergency valve chamber 67 is in open communication through the passage 68, and the atmosphere through the exhaust chamber 69 and exhaust port 71. A spring 72 is provided in the emergency valve chamber that engages the emergency valve 66 urging it to its seated position. A valve stem 73 is provided for the valve 66 and extends through a bore between the emergency valve chamber 67 and the exhaust chamber 69, and is positioned to be engaged by movement of a cam 74 positioned on the shaft 62, when the handle 65 is rotated to emergency position, as best shown in Fig. 4, thus opening communication between the emergency brake pipe 13 and the atmosphere to effect an emergency application of the brakes in a manner to be later explained.

The emergency brake pipe 13 is charged with fluid under pressure by a feed valve 10 from the main reservoir 2 carried by the first unit of the train, through pipe and passage 23 and a restricted port 75 in the bracket section of the brake valve device 8.

The retardation controller section 9 of the brake valve device 8 includes a chamber 76 containing an inertia element 77 that is mounted upon a lever 78 supported by the pin 79, and carrying at its lower end an electrical contact member 81 that is adapted to engage fixed contact members 82 and 83. A bore 84 is provided in the casing section 9 into which is interfitted a slidable sleeve 85 that engages the inertia element 77. A spring 86 is provided within the sleeve 85, one end of which is in engagement with the closed end of the sleeve and the other end of which is in engagement with a head 87 carried by a rod 88 that extends from the enlarged portion of the bore 84, through a smaller portion to engage a cam 89 within the chamber 69 carried by the brake valve operating shaft 62.

The pipe 21 connects the pressure chamber 19 within the brake valve device 8 to a piston chamber 91 within the pressure operated rheostat 7. A piston 92 is provided within the piston chamber 91 having a stem 93 of non-magnetic material that extends downwardly and engages a core 94 of magnetic material which extends through an opening in a nut 95 in the lower end of the piston chamber and engages a rheostat arm 96 pivotally supported by the pin 97. The contact arm 96 is provided with a contact member 98 at its outer end that is adapted to engage one of the contact members 201 associated with a resistor 99 for varying the voltage applied between the train wires 14 and 15 when fluid under pressure is admitted to the piston chamber 91. A spring 101 is provided that connects the arm 96 to the frame of the pressure operated rheostat 7 for maintaining the arm in its upper, or illustrated, position when the piston chamber 91 is at atmospheric pressure. An electric winding 102 in the lower portion of the casing surrounds the armature 94, and is connected by conductors 103 and 104 to be energized in accordance with the voltage applied to the train wires 14 and 15 for exerting an upward force on the armature 94 in opposition to the downward force exerted by the piston stem 93. The position of the contact carrying arm 96 when fluid under pressure is admitted to the piston chamber 91 is determined by the position of the contact arm necessary to apply a voltage across the train wires 14 and 15, and consequently across the winding 102, that will be of such a value as to equalize the downward force of the piston 92 for any degree of fluid pressure within the piston chamber 91.

A check valve 105 is provided, interposed between the pipes 20 and 21 between branch pipes 106 and 107 leading to the magnet valve devices 11 and 12, for the purpose of permitting the release of fluid under pressure from the piston chamber 91 to the pressure chamber 19 and to the atmosphere independently of the magnet valve device 11. The magnet valve device 11 comprises a magnet winding 108 that is operatively connected to a valve 109 for controlling communication between a chamber 111, that is in communication with the pipe 21 through the branch pipe 106, and the valve chamber 12, that is in communication with the branch pipe 107 through passage 113. A spring 114 is provided within the chamber 111 for normally urging the valve 109 from its seat. The magnet valve device 12 comprises a magnet 115 that is operatively connected to a valve 116 for controlling the release of fluid from the piston chamber 91 to the atmosphere through branch pipe 107, passage 113, chamber 117, exhaust chamber 118 and exhaust port 119. A spring 121 is provided within the chamber 117 for urging the valve 116 to its seat.

The self-lapping magnet valve device 5 comprises an operating winding 122 and a core member 123, to the lower end of which a diaphragm 124 and a stem 125 are attached, the stem providing a valve seat 126 for a release valve 127 positioned within a diaphragm chamber 129 for controlling communication between the chamber 129, that is connected to the relay valve device 3 through an application and release pipe 133 and the emergency valve device 4, and an outlet chamber 128, that is connected to the atmosphere through the outlet port 131. A spring 132 is provided within the diaphragm chamber 129 for urging the stem 125 and the core 123 upwardly to unseat the valve 127 and effect communication between the application and release pipe 133 and the atmosphere. A valve 134 is provided in axial alignment with the valve 127 having a seat in a partition wall 135 of the casing and is provided with an upwardly extending stem 136 which extends through a bore in said wall and engages the valve 127. The valve 134 controls communication between the fluid pressure supply valve chamber 137, that is connected to the supply or main reservoir pipe 23, and the diaphragm chamber 129 at the under side of the diaphragm 124 that is connected to the application and release pipe 133. A spring 139 is provided within the chamber 137 for urging the valve 134 to its seat and a stop 140 is provided in the lower part of the casing structure to limit the downward movement of the valve 134. The upward movement of the core 123 is limited by a stop 141 in the form of a bolt inserted through the upper wall of the casing structure and its downward movement is limited by a nut 143 screw-threadedly attached to the core and adapted to engage a flanged washer 144 attached to the casing.

The emergency valve device 4 comprises a casing having a piston chamber 151, that is in communication with the emergency pipe 13 through port 152, and that contains a piston 153 provided with a stem 154 for operatively engaging a slide valve 155 within the valve chamber 156. A passage 157 within the casing wall effects communication from the main reservoir pipe 23 to the slide valve chamber 156 through the passage 158, and to the piston chamber 151 through the charging choke 159 when the piston 153 is in its release or illustrated position. A spring 160 is provided within the piston chamber 151, one end of which engages the casing wall of the piston chamber and the other end of which engages the piston 153 for urging it to its release position. When the slide valve 155 is in its release position a port 161 therein registers with a passage 162 leading from the valve seat to connect a quick action chamber 163 to the slide valve chamber 156, and a cavity 164 in the slide valve effects communication between the pipe and passage 133, leading from the self-lapping magnet valve device 5, to the passage and pipe 165, leading to the face of the piston chamber of the relay valve device 3.

Disposed in the emergency valve casing is a brake pipe vent valve device comprising a piston 167 contained in chamber 166 and a vent valve 169 which is operatively connected to piston 167 by means of a stem 168, the operation of the vent valve being adapted to vent fluid under pressure from the emergency brake pipe to effect an emergency rate of reduction in brake pipe pressure.

The relay valve device 3 comprises a casing having a piston chamber 182 constantly connected to the application and release pipe 165 through a passage 184 and containing a piston 185 which is adapted, through the medium of a stem 186, to operate a slide valve 187 operatively connected to the stem and contained in a valve chamber 188 that is constantly connected to the brake cylinders 1 through a brake cylinder pipe 189. Also contained in the casing is a fluid pressure supply valve 191 which is subject to the pressure of a spring 192 and which is provided with a stem 193 that is adapted to be operatively engaged by the end of the piston stem 186.

The relay valve device 3 is shown in its brake releasing position, in which the relay piston 185 and slide valve 187 are in their extreme left, or brake releasing, positions. With the slide valve 187 in this position the valve chamber 188, and consequently the brake cylinders 1, are connected to the atmosphere through an exhaust passage 194. With the piston 185 in release position the stem 186 will be out of engagement with the end of the supply valve stem 193, so that the pressure of the spring 192 will maintain the supply valve 191 seated against its seat rib 195, thereby maintaining communication closed from a chamber 196, that is constantly connected to the main reservoir 2 through a main reservoir pipe 23, to the valve chamber 188.

The several figures of the drawings illustrate the several parts of the equipment in their brake releasing, or charging, positions. In this position of the various parts of the equipment the emergency pipe 13 is charged with fluid under pressure from the main reservoir 2 on the first train unit through the feed valve 10, the pipe and passage 23 and the restricted port 75 in the bracket section of the brake valve device 8. From the emergency pipe 13, that extends throughout the length of the train, fluid under pressure flows to the chamber 151 and the vent valve chamber 172 of each emergency valve device 4, which are charged in part from the emergency pipe 13 through branch pipe and port 152, and in part through passage 157, that is in communication with the main reservoir 2 associated with the particular brake unit, and the restricted charging port 159. The slide valve chamber 156 is also charged from the passage 157 through port 158, and the quick action chamber 164 is charged from the slide valve chamber 156 through port 162 in the slide valve and the passage 163.

If the operator wishes to apply the brakes, the brake valve handle 65 is moved to a position within its application zone, thus permitting fluid under pressure to pass from the main reservoir pipe 23, past the supply valve 24, into the pressure chamber 19 within the brake valve device 8 until the pressure within the chamber 19, and within the piston chamber 91 of the pressure operated rheostat 7, builds up to a value depending upon the degree of movement of the brake handle 65 from its release position.

When the handle 65 is moved from release position, the cam 61 forces the plunger 53 toward the right. The first portion of this movement effects a compression of the spring 48 and the seating of the release valve 42, closing communication between the pressure chamber 19 and the atmosphere through the passages 41, 44 and 38. Further movement of the plunger 53 toward the right causes the spaced levers 51 to pivot about their lower ends, further movement of the roller 56 toward the right being prevented by the regulating spring 39, and causes the rod 58 to force the supply valve 24 against the compression of the supply valve spring 27 to open communication between the main reservoir pipe 23 and the chamber 19 through passage 23 and the supply chamber 22, thus supplying fluid under pressure from the main reservoir 2 on the first train unit to the pipe 21 leading to the pressure controlled rheostat 7.

The amount of fluid under pressure supplied to the pressure chamber 19, and to the pipe 20, is dependent upon the degree of movement of the cam 61 from its release position, since while the pressure within the chamber 19 increases due to flow of fluid thereto through the supply valve 24, a pressure is exerted on the chamber side of the piston 35 in opposition to the pressure exerted by the regulating spring 39. This pressure continues to build up until it becomes sufficient to force the piston 35 toward the right, relieving the pressure on the roller 56 and permitting the supply valve spring 27 to force the rod 58 toward the left, pivoting the levers 51 about the pivot pin 52 and moving the supply valve 24 into engagement with its seat 26. The amount of pressure on the chamber side of the piston 35 necessary to effect sufficient movement of the piston 35 to cause the supply valve 24 to seat, is dependent upon the amount of movement of the handle 65 and of the cam 61 away from their release positions. The greater the movement of the cam from its release position the greater will be the movement of the pivot pin 52 toward the right, and, consequently, the greater will be the compression of the regulating spring 39 necessary to permit movement of the levers 51, and of the rod 58, to effect the seating of the supply valve 24. It will be apparent, therefore, that the brake valve device is self-lapping on a pressure basis, the degree of fluid pressure within the pressure chamber 19 and the pipe 23 necessary to effect the movement of the valves to lap position being dependent upon the degree of movement of the handle 65 from its release position.

The pressure operated rheostat 7 is operated to move the contact member 98 downwardly into engagement with one of the contact members 201 associated with the resistor 99, the degree of movement being dependent upon the amount of pressure within the piston chamber 91. This operation of the rheostat 7 causes the train wire 14 to be connected to one terminal of the constant voltage source of electric energy 6 through conductor 202, junction point 203, conductor 204, rheostat contact member 98 and a portion of the resistance 99. The train wire 15 is constantly connected to the other terminal of the constant voltage source 6 through conductor 205 and junction point 206. The winding 102 of the pressure operated rheostat 7 is connected by conductors 104 and 103 to the train wires 14 and 15, respectively, to be energized in accordance with the voltage impressed between them. As the movable contact member 98 moves downwardly, engaging successive contact members 201 associated with the resistor 99, the amount of the resistor 99 connected between the source 6 and the train wire 14 is decreased, thus increasing the voltage between the train wires 14 and 15 until the upward pull on the armature resulting from the degree of energization of the winding 102 is sufficient to balance the downward pressure on the piston 92. The voltage between the train wires 14 and 15 will therefore always be proportional to the fluid pressure within the piston chamber 91 of the rheostat 7.

The windings 122 of the self-lapping magnet valve devices 5 are connected by conductors 103 and 207, respectively, to the train wires 15 and 14 to be energized in accordance with the voltage between the train wires.

Upon energization of the winding 122 the core 123 is moved downwardly, bringing the seat 126 against the valve 127 to close communication between the chamber 129 and the outlet chamber 128, and, upon further downward movement of the core, to force the valve 134 from its seat, thus opening communication between the chamber 137 and the chamber 129. Fluid under pressure thus passes from the pipe 23 through chamber 137, chamber 129, application and release pipe 133 to effect an application of the brakes. As fluid under pressure enters the chamber 129 the pressure of this fluid against the diaphragm 124 tends to urge the core 123 upwardly, causing the valve 134 to seat when the fluid pressure within the chamber 129 has become equal to or greater than the downward force of the magnet. The particular pressure at which the valve 134 will seat depends therefore upon the degree of energization of the winding 122.

Fluid under pressure passes from the pipe 133 through the cavity 164 in the slide valve 155, passage and pipe 165 and the restricted port 184 to the piston chamber 182 of the relay valve device 3, so that the pressure within the piston chamber 182 of the relay valve is equal to the pressure within the diaphragm chamber 129 of the self-lapping magnet valve device.

Fluid under pressure thus supplied to the relay piston chamber 182 causes the relay piston 185 of the relay valve device 3 to move toward the right carrying the slide valve 87 with it. As the relay piston and valve are thus moved, the valve laps the release port 194, closing communication from the relay slide valve chamber 188 to the atmosphere. After the port 194 is lapped, the end of the piston stem 186 engages the stem 193 of the supply valve 191 and causes this valve to be unseated from its seat rib 195 against the pressure of the spring 192. With the supply valve 191 unseated, fluid under pressure is supplied from the main reservoir 2 through the main reservoir pipe 23, chamber 197, past the unseated valve 191 to valve chamber 188 and brake cylinder pipe 189 to the brake cylinders 1.

With the relay piston and valve in this position a force is exerted to move the piston 185 and valve 187 away from the supply valve 191 that consists of the pressure within the valve chamber 188 plus the pressure of the spring 192. When the pressure in the chamber 188 builds up to substantially the pressure of the face of the piston 185 as supplied through application and release pipe 165, the piston is moved away from the supply valve 191 sufficiently to permit it to seat and cut off communication between the main reservoir 2 and the brake cylinders. When the supply valve 191 seats, the spring 192 no longer forces the valve stem 193 against the piston stem 186, so that the piston 185 and the valve 187 do not move further or sufficiently to open communication between the valve chamber 188 and the release port 194. Fluid under pressure is, therefore, retained in the valve chamber 188 and in the brake cylinders, that is substantially equal to the pressure in the application and release pipe 165 and in the diaphragm chamber 129 of the self-lapping magnet valve device 5.

As the operator moves the handle 65 of the brake valve device 8 from its release position to a position within its service application zone, the rod 88 is moved by the cam 89 toward the right, compressing the spring 86 an amount depending upon the degree of movement of the handle 65 from its release position, and thus correspondingly increasing the force required to be exerted by the inertia element or weight 77 against the spring 86 to move the lever 78 about the pivot pin 79, so as to cause engagement of the contact member 81 with the contact members 82 and 83. Since the force tending to move the weight 77 toward the left is a measure of the rate of the retardation of the vehicle, the degree of compression of the spring 86, as determined by the position of the brake valve handle 65, is a measure of the rate of retardation of the vehicle to be effected by the retardation controller.

If the rate of retardation of the vehicle becomes sufficient to move the weight 77 against the pressure of the spring 86, and to move the lever 78 about the pivot pin 79 to cause engagement of the contact members 81 and 82, a circuit is completed from one terminal of the source of electric energy 6 through conductor 202, contact members 81 and 82, conductor 208, the winding of the magnet 108 of the magnet valve device 11 and conductor 205 to the other terminal of the source 6. The magnet 108 is thus energized, causing the valve 109 to be moved downwardly and close communication from the pressure chamber 19 of the brake valve device 8 to the piston chamber 91 of the pressure operated rheostat 7 to prevent a further increase in the degree of application of the brakes. If the rate of retardation of the vehicle is sufficient to cause the weight 77 to move against the compression of the spring 86, to compress the spring sufficiently to cause engagement of the contact members 81 and 83, a circuit is completed from the source of electric energy 6 through conductor 202, contact members 81 and 83, conductor 209, the winding of the magnet 115 of the magnet valve device 12, and conductor 205 to the other terminal of the source of energy 6. The energization of the winding of the magnet 115 causes the release valve 116 to be moved downwardly from its seat against the pressure of the spring 121 to open communication between the piston chamber 91 of the pressure operated rheostat 7 and the atmosphere through the exhaust port 119, thus effecting an upward movement of the piston 92 and an increase in the resistance 99 in series with the train wire circuit to cause operation of the devices 5 to effect a decrease in the degree of application of the brakes.

If the operator wishes to effect a release of the brakes, the brake valve handle 65 is moved to its release position, thus operating the cam 61 to relieve the pressure against the end of the movable plunger 53 which is forced toward the left by the supply valve spring 27 and the release valve spring 48 acting on the upper and lower ends, respectively, of the spaced levers 51. Upon movement of the plunger 53 toward the left, the release valve 42 will be moved to its unseated position by the spring 48 to effect communication between the pressure chamber 19 and the atmosphere through passage 41, release valve chamber 40, passage 44, chamber 37 and exhaust port 38.

The release of fluid under pressure from the pressure chamber 19 of the brake valve device 8 also effects the release of fluid under pressure from the piston chamber 91 of the pressure operated rheostat 7 through pipe 21, the passages and chambers of the magnet valve device 11 to pressure chamber 19 and to the atmosphere. If the valve 109 of the magnet valve device 11 should be in its seated position, upon the release of fluid under pressure from the pressure chamber 19, fluid under pressure will then be released from the piston chamber 91 to the pressure chamber 19, past the check valve 105. Upon the release of fluid under pressure from the piston chamber 91, the contact carrying arm 96 of the pressure operated rheostat is moved upwardly, the spring 101 serving to hold it in its illustrated position, until fluid under pressure is again applied to the upper side of the piston 92. The upward movement of the contact member 98 interrupts the circuit to the train wire 14, thus deenergizing the windings 122 of the self-lapping magnet valve devices 5, whereupon the spring 132 in the diaphragm chamber 129 forces the stem 124 and the core 123 upwardly to unseat the valve 127, to effect communication from the piston chamber 182 of the relay valve device 3 to the atmosphere through pipe and passages 165 and 133, and the exhaust port 131 of the self-lapping magnet valve devices 5. Upon the release of fluid under pressure from the piston chamber 182 of the relay valve device 3, the piston is moved toward the left by the pressure within the valve chamber 188, thus moving the slide valve 187 to uncover the exhaust port 194 to effect communication from the brake cylinders 1 to the atmosphere through the slide valve chamber 188 and the exhaust port 194 to effect a release of the brakes.

If the operator desires to make an emergency application of the brakes the brake valve handle 65 is moved to its emergency application position, thus bringing the extended portion 211 of the surface of the cam 74 into engagement with the emergency valve stem 73 as best shown in Fig. 4, and forcing the emergency valve 66 from its seat against the pressure of the spring 72 to effect communication from the emergency pipe 13 to the atmosphere through the emergency valve chamber 67, the exhaust chamber 69, and the exhaust port 71. This venting of fluid under pressure from the emergency pipe 13, effects the release of fluid under pressure from the piston chamber 151 at a faster rate than fluid can be supplied through the restricted charging choke 159, thus effecting a reduction in piston chamber pressure. Since the pressure within the slide valve chamber 156, acting on the rear of the piston 153, is now greater than the pressure on the face of the piston, the piston 153 and the slide valve 155, are moved toward the right to their emergency application positions, thus closing communication between the quick action chamber 163 and the slide valve chamber 156, through port 161 and effecting communication between the quick action chamber 163 and the vent valve piston chamber 166, through the cavity 178 in the slide valve, to force the vent valve piston 167 and the vent valve 169 downwardly to effect a rapid venting of fluid under pressure from the emergency pipe 13, through passage 171, vent valve chamber 172, and the exhaust port 173.

A spring 174 is provided in the vent valve chamber 172 for biasing the valve against its ring seat 175. A choke 176 is provided in the vent valve piston 167 for effecting a slow release of fluid under pressure from the piston chamber 166 to the atmosphere through the exhaust port 173 until the pressure in the chamber 166 is reduced substantially to atmospheric pressure, when the spring 174 forces the valve 169 to its seat. A passage 177 leads from the piston chamber 166 to the seat of the slide valve 155 and when the valve is moved to the right, to its emergency application position, effects connection through a cavity 178 with a quick action chamber 163, so that fluid under pressure is supplied from the normally charged chamber 163 to the vent valve piston chamber 166 and thereby the piston 167 is operated to move the vent valve 169 from its seat. A quick reduction in emergency brake pipe pressure is then effected by the venting of fluid under pressure from the emergency brake pipe to the exhaust port 173. The rapid venting of fluid under pressure from the emergency pipe 13 causes an emergency rate of reduction in emergency pipe pressure to pass serially and rapidly through the train, due to the serial operation of the emergency vent valves of the succeeding brake units, and insures the prompt movement of the emergency valve devices to emergency position.

Upon movement of the slide valve 155 to its emergency position, the end of the slide valve uncovers the passage 165 leading to the slide valve seat, thus effecting communication from the slide valve chamber 156 to the piston chamber 182 of the relay valve device 3, so that fluid at main reservoir pressure is supplied from valve chamber 156 to the relay valve. The relay valve device is then operated to effect an emergency application of the brakes in the same manner as when effecting a service application of the brakes.

If the operator wishes to release the brakes after an emergency application thereof, the brake valve handle 65 is moved to its release position, and, after the emergency pipe has been charged from the main reservoir pipe 23 through the restricted passage 75 in the brake valve device sufficiently that the pressure in the piston chamber 151 plus the pressure of the spring 161 becomes greater than the pressure in the slide valve chamber 156 on the rear of the piston 153, the piston 153 and the slide valve 155 move to their release, or illustrated, positions, effecting the release of fluid under pressure from the relay valve piston chamber 182 to the atmosphere, through the cavity 164 in the slide valve 155, and the exhaust port 131 in the self-lapping magnet valve device 5 in the same manner as when releasing the brakes after a service application thereof.

While I have illustrated and described one preferred embodiment of my invention, it will be apparent to those skilled in the art, that many modifications thereof may be made within the spirit of my invention and I do not wish to be limited otherwise than by the scope of the appended claims.

Having now described my invention, what I claim as new and desire to secure by Letters Patent, is:

1. In a brake equipment for vehicles, in combination, a brake cylinder, manually operable means for controlling the supply of fluid under pressure to said brake cylinder, a retardation controller comprising an inertia device mounted on said manually operable means responsive to the rate of deceleration of the vehicle for regulating the degree of fluid pressure in said brake cylinder, and means responsive to the position of said manually operable means for varying the setting of said retardation controller.

2. In a fluid pressure brake, in combination, a brake cylinder, valve means for controlling the supply of fluid under pressure to said brake cylinder, valve means for controlling the release of fluid under pressure from said brake cylinder, a manually operable self-lapping brake valve device for controlling the operation of said valve means and having a service application zone, movement to a position in which zone supplies fluid under pressure to effect an application of the brakes, and means including an inertia type retardation controller which is adjusted for a selected rate of retardation which corresponds to the position of the manually operable means in the service application zone for automatically controlling the degree of application of the brakes to effect the said selected rate of a retardation of the vehicle.

3. In a fluid pressure brake, in combination, a brake cylinder, a self-lapping valve means for controlling the supply of fluid under pressure to said brake cylinder, manually operable means for controlling the operation of said valve means and having a service application zone, movement to a position in which zone supplies fluid under pressure to effect an application of the brakes, and means including an inertia type retardation controller which is adjusted for a selected rate of retardation corresponding to the position of the manually operable means in the service application zone for automatically controlling the application of the brakes to provide the said selected rate of retardation of the vehicle.

4. In a brake equipment for vehicles, in combination, a plurality of braking units each including a brake cylinder and an electric self-lapping valve device for controlling the supply of fluid under pressure to said brake cylinder, a pressure operated rheostat for controlling said electric self-lapping valve devices, said pressure operated rheostat having an electric winding energized in accordance with the degree of energization of said self-lapping valve devices and a fluid pressure chamber, and means for exerting a force in accordance with the degree of energization of the winding, and means differentially responsive to the force of said winding responsive means and to the degree of fluid pressure developed within said fluid pressure chamber, and manually operable means for controlling the supply of fluid under pressure to said pressure chamber.

5. In a brake equipment for vehicles, in combination, a plurality of braking units each including a brake cylinder and an electric self-lapping valve device for controlling the supply of fluid under pressure to said brake cylinders, an electric circuit for controlling the degree of energization of said self-lapping valve devices, a pressure operated rheostat for controlling the operation of said self-lapping valve devices and including a fluid pressure chamber, a winding energized from said circuit, and means differentially responsive to the pressure supplied to said pressure chamber and to the energization of said winding for controlling the voltage of said circuit, and a brake valve device for controlling the supply of fluid under pressure to the pressure chamber of said pressure operated rheostat.

6. In a fluid pressure brake, in combination, a brake cylinder, an electric self-lapping valve device for controlling the supply of fluid under pressure to said brake cylinder, an electric circuit for controlling the degree of energization of said self-lapping valve device, a pressure operated rheostat for controlling the operation of said self-lapping valve device comprising a pressure chamber, a winding energized from said circuit, and means differentially responsive to the pressure supplied to said chamber and to the energization of said winding for controlling the voltage of said circuit, a manually operable self-lapping brake valve device for controlling the supply of fluid under pressure to the pressure chamber of said pressure operated rheostat, and a retardation controller for varying the fluid pressure acting on said rheostat according to the rate of retardation of the vehicle.

7. In a fluid pressure brake, in combination, a brake cylinder, an electric self-lapping valve device for controlling the supply of fluid under pressure to said brake cylinder, a rheostat device having a pressure chamber and being responsive to the supply of fluid under pressure thereto for controlling the energization of said self-lapping valve device, manually operable means for controlling the supply of fluid under pressure to said pressure chamber, and a retardation controller responsive to the rate of deceleration of the vehicle for regulating the degree of pressure in said pressure chamber.

8. In a fluid pressure brake, in combination, a brake cylinder, an electric self-lapping valve device for controlling the supply of fluid under pressure to said brake cylinder, a rheostat device having a pressure chamber and responsive to the supply of fluid under pressure to said pressure chamber for controlling the energization of said self-lapping valve device, manually operable means for controlling the supply of fluid under pressure to said pressure chamber, a retardation controller responsive to the rate of deceleration of the vehicle for regulating the degree of pressure in said pressure chamber, and means responsive to the position of said manually operable means for varying the setting of said retardation controller.

9. In a brake equipment for vehicles, in combination, a plurality of braking units each including a brake cylinder and an electric self-lapping valve device for controlling the supply of fluid under pressure to the brake cylinder, manually operable means for correspondingly controlling said several electric self-lapping valve devices, and a retardation controller associated with said manually operable means for modifying the operation of said several electric self-lapping valve devices responsive to the rate of deceleration of the vehicle for regulating the pressure in said brake cylinder.

10. In a brake equipment for vehicles, in combination, a plurality of braking units each including a brake cylinder and an electric self-lapping valve device for controlling the supply of fluid under pressure to said brake cylinder, manually operable means for controlling said electric self-lapping valve devices, a retardation controller responsive to the rate of deceleration of the vehicle for regulating the pressure in said brake cylinder, and means responsive to the position of said manually operable means for varying the setting of said retardation controller.

11. In a brake equipment for vehicles, in combination, a plurality of braking units each including a brake cylinder and an electric self-lapping valve device for controlling the supply of fluid under pressure to said brake cylinder, manually operable means for controlling said electric self-lapping valve devices, and means including an inertia type retardation controller effective when the manually operable means is positioned in a service application zone for automatically controlling the application of the brakes to effect a selected rate of retardation of the vehicle.

12. In an electropneumatic brake equipment, in combination, a plurality of braking units each including an electrically controlled self-lapping valve device for controlling the application of the brakes, means for effecting a service application of the brakes including an electric circuit for controlling said self-lapping valve devices, a self-lapping brake valve device and a pressure operated rheostat controlled thereby for varying the voltage applied to said electric circuit, an emergency pipe, and means associated with each braking unit and responsive to a reduction in emergency pipe pressure for effecting an emergency application of the brakes.

13. In a fluid pressure brake, in combination, electrically controlled means for regulating the degree to which the brakes are applied in accordance with the degree of energization thereof, a brake valve device and fluid pressure biased means operated according to the degree of fluid under pressure supplied thereto by the brake valve device for varying the degree of energization of said electrically controlled means, and electrically operated means energized in accordance with the energization of said electrically controlled means for limiting the operation of said fluid pressure operated means.

14. In a fluid pressure brake, in combination, electrically controlled means for regulating the degree to which the brakes are applied in accordance with the degree of energization thereof, fluid pressure biased means operated according to the degree of fluid under pressure supplied thereto for varying the degree of energization of said electrically controlled means, electrically operated means energized in accordance with the energization of said electrically controlled means for limiting the operation of said fluid pressure operated means and manually controlled means for varying the degree of fluid under pressure supplied to said fluid pressure operated means in accordance with the extent of movement of said manually controlled means.

15. In a fluid pressure brake, in combination, electrically controlled means for regulating the degree to which the brakes are applied in accordance with the degree of energization of said electrically controlled means, fluid pressure operated means movable according to the degree of fluid under pressure supplied thereto for varying the degree of energization of said electrically controlled means, electrically operated means energized in accordance with the energization of said electrically controlled means for limiting the operation of said fluid pressure operated means and means for opposing movement of said fluid pressure operated means by fluid under pressure according to the degree of energization of said electrically controlled means.

16. In a fluid pressure brake, in combination, electrically controlled means for regulating the degree to which the brakes are applied in accordance with the degree of energization of said electrically controlled means, fluid pressure operated means movable according to the degree of fluid under pressure supplied thereto for varying the degree of energization of said electrically controlled means, and means for varying the fluid pressure on said fluid pressure operated means according to the rate of retardation of the vehicle.

17. In a fluid pressure brake, in combination, electrically controlled means for regulating the degree to which the brakes are applied in accordance with the degree of energization of said electrically controlled means, fluid pressure operated means movable according to the degree of fluid under pressure supplied thereto for varying the degree of energization of said electrically controlled means, manually operable means for supplying fluid pressure to said fluid pressure operated means in accordance with the extent of movement of said manually operable means, and means for varying the fluid pressure on said fluid pressure operated means according to the rate of retardation of the vehicle.

18. In a fluid pressure brake, in combination, a brake cylinder, a relay valve device operated by fluid under pressure for supplying fluid under pressure to said brake cylinder, electrically controlled means for supplying fluid under pressure to said relay valve device to a degree corresponding with the degree of energization of said electrically controlled means, fluid pressure controlled means operated according to the degree of fluid under pressure supplied thereto for varying the degree of energization of said electrically controlled means, manually controlled means for supplying fluid under pressure to said fluid pressure controlled means to a degree corresponding with the extent of movement of said manually controlled means, an electrically controlled device for varying the fluid pressure supplied to said fluid pressure controlled means, and a retardation controller for controlling the operation of said electrically controlled device in accordance with the rate of retardation of the vehicle.

ELLIS E. HEWITT.

CERTIFICATE OF CORRECTION.

Patent No. 2,148,751. February 28, 1939.

ELLIS E. HEWITT.

It is hereby certified that error appears in the printed specification of the above numbered patent requiring correction as follows: Page 8, first column, line 13, claim 13, for the word "biased" read operated; line 14, same claim, for "operated" read biased; line 26, claim 14, for "biased means operated" read operated means biased; and that the said Letters Patent should be read with this correction therein that the same may conform to the record of the case in the Patent Office.

Signed and sealed this 31st day of October, A. D. 1939.

(Seal)

Henry Van Arsdale,
Acting Commissioner of Patents.